(12) United States Patent
Cherney et al.

(10) Patent No.: US 10,795,463 B2
(45) Date of Patent: Oct. 6, 2020

(54) MACHINE CONTROL USING A TOUCHPAD

(71) Applicant: DEERE & COMPANY, Moline, IL (US)

(72) Inventors: Mark J. Cherney, Potosi, WI (US); Bryan Rausch, Dubuque, IA (US); Joshua D. Hoffman, Moline, IL (US); Giovanni A. Wuisan, Dubuque, IA (US); Ronald J. Huber, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/166,681

(22) Filed: Oct. 22, 2018

(65) Prior Publication Data

US 2020/0125191 A1 Apr. 23, 2020

(51) Int. Cl.
*G06F 3/0354* (2013.01)
*G06F 3/0488* (2013.01)
*G06F 3/041* (2006.01)
*G06F 3/044* (2006.01)

(52) U.S. Cl.
CPC .......... *G06F 3/03547* (2013.01); *G06F 3/044* (2013.01); *G06F 3/0414* (2013.01); *G06F 3/0488* (2013.01)

(58) Field of Classification Search
None
See application file for complete search history.

(56) References Cited

U.S. PATENT DOCUMENTS

| 8,249,823 | B2 | 8/2012 | White et al. | |
|---|---|---|---|---|
| 8,843,271 | B2 | 9/2014 | Takenaka et al. | |
| 9,619,032 | B1 | 4/2017 | Ekambaram et al. | |
| 2009/0195659 | A1* | 8/2009 | Nagata | G06F 3/03547 348/207.1 |
| 2010/0268426 | A1* | 10/2010 | Pathak | G06F 3/03547 701/48 |
| 2014/0298259 | A1* | 10/2014 | Meegan | B60K 37/06 715/810 |

(Continued)

OTHER PUBLICATIONS

Web page "How to Use iPhone X Reachability to Reach the Top of the Screen", published Nov. 28, 2017, by Josh Smith; pp. 1-6.

*Primary Examiner* — David D Davis
(74) *Attorney, Agent, or Firm* — Taft Stettinius & Hollister LLP; Stephen F. Rost

(57) ABSTRACT

Touchpads are disclosed for machine control by an operator. A touchpad can include a surface, zones and command processor. The surface senses operator touch. The zones can be assigned zones. The touchpad can include dividers that separate the surface into the zones, and dividers can be assigned dividers. Each of the assigned zones and dividers can be selectively configured to control an assigned machine function. The command processor generates and sends commands to control the assigned machine functions based on operator touch of the assigned zones and dividers. The surface and dividers can have differing heights and/or textures. Illumination can distinguish assigned or selected zones and dividers. The dividers can be grouped to function as a joystick. Pressing different dividers can command machine functions in different directions. The touchpad controls can share power and signal connections, and can be mounted on a control stick.

19 Claims, 10 Drawing Sheets

(56) References Cited

U.S. PATENT DOCUMENTS

| | | | |
|---|---|---|---|
| 2015/0200665 A1* | 7/2015 | Arakawa | H03K 17/9622 200/5 A |
| 2015/0212584 A1* | 7/2015 | Aoyama | G06F 3/017 345/173 |
| 2016/0004374 A1* | 1/2016 | Kneuper | G06F 3/0416 345/173 |
| 2016/0139724 A1* | 5/2016 | Miller | G06F 3/0488 345/173 |
| 2016/0378200 A1* | 12/2016 | Lee | G06F 3/03547 345/158 |
| 2017/0024007 A1* | 1/2017 | Pelis | G06F 3/014 |
| 2017/0123516 A1* | 5/2017 | Li | G06F 3/0346 |
| 2017/0169730 A1 | 6/2017 | Choi | |
| 2017/0269768 A1* | 9/2017 | Shin | B60K 35/00 |
| 2017/0308239 A1* | 10/2017 | Higashihara | G06K 9/00604 |
| 2017/0308259 A1* | 10/2017 | Regnier | B60K 37/06 |
| 2017/0364243 A1* | 12/2017 | Regnier | B60K 35/00 |
| 2017/0371515 A1* | 12/2017 | Feit | G06F 3/038 |
| 2018/0134158 A1* | 5/2018 | Muller | G06F 3/04883 |

\* cited by examiner

MACHINE CONTROL USING A TOUCHPAD

FIELD OF THE DISCLOSURE

The present disclosure relates to machinery control, and more particularly to operator selectable controls and placement of those controls for ease of access.

BACKGROUND

Vehicles, as well as other devices and machines, are being built with more and more functionality, and are becoming more and more automated, which puts more and more controls in the hands and/or at the fingertips of the operator. This is true in machinery (agricultural, construction, forestry, etc.), personal and work vehicles, and many other devices. One of the challenges with this growth in the number of functions for the operator to control, is how to put the control mechanisms in front of the operator so they have access to the functionality they want to control. For example, in a case where one-handed operator control is desirable, the controls can only get so small before they can no longer be reliably selected by the operator's finger or thumb, and the hand can only stretch so far before a control panel or surface requires the operator to use two hands to reach some controls.

It would be desirable to provide an operator with a control device that has configurable controls so the operator can put the control mechanisms they desire in acceptable reach.

SUMMARY

A touchpad is disclosed for control of a machine by an operator where the machine has multiple machine functions. The touchpad includes a surface, zones and a command processor. The surface is configured to sense touch by the operator. The zones are disposed on the surface, and one or more of the zones is an assigned zone, where each of the assigned zones is selectively configured to control an assigned machine function of the multiple functions of the machine. The command processor communicates with the zones. The command processor is configured to generate and send commands to control each of the assigned machine functions based on touch by the operator of the assigned zones. The surface can be configured to sense touch by the operator based on capacitive changes due to touch by the operator. The surface can be configured to sense touch by the operator based on mechanical pressure changes due to touch by the operator. The surface can include a display screen. The touchpad can be mounted on a control stick, where the control stick is movable by the operator to control a function of the machine.

The touchpad can also include dividers disposed on the surface, where the dividers separate the surface into the plurality of zones. One or more of the dividers can be an assigned divider, where each of the assigned dividers is selectively configured to control an assigned machine function of the multiple functions of the machine. The command processor communicates with the zones and dividers. The command processor is configured to generate and send commands to control each of the assigned machine functions based on touch by the operator of the assigned zones and dividers.

The dividers can be at a different height than the surface, where the height difference is distinguishable based on touch. The surface can have a first texture and the dividers can have a second texture, where the first texture is distinguishable from the second texture based on touch.

The surface can be configured to illuminate in a first color each of the assigned zones and dividers, and not to illuminate in the first color any of the zones and dividers that are not assigned zones and dividers. The surface can be configured to illuminate in a second color each of the assigned zones and dividers that is currently activated or selected by the operator.

The dividers can include a first divider and a second divider that lie on a first line, and a third divider and a fourth divider that lie on a second line, where the first and second lines are perpendicular and cross at an intersection location. The first divider can extend away from the intersection location in a first touchpad direction, the second divider can extend away from the intersection location in a second touchpad direction that is opposite the first touchpad direction, the third divider can extend away from the intersection location in a third touchpad direction, and the fourth divider can extend away from the intersection location in a fourth touchpad direction that is opposite the third touchpad direction. The first, second, third and fourth dividers can be configured to function as a dual-axis joystick and assigned to control a two-dimensional function of the machine; such that the command processor generates and sends commands to command the two-dimensional function in a first function direction based on touch by the operator of the first divider, generates and sends commands to command the two-dimensional function in a second function direction based on touch by the operator of the second divider, generates and sends commands to command the two-dimensional function in a third function direction based on touch by the operator of the third divider, and generates and sends commands to command the two-dimensional function in a fourth function direction based on touch by the operator of the fourth divider. The second function direction can be opposite of the first function direction, and the fourth function direction can be opposite of the third function direction.

The touchpad can include first, second, third and fourth limit selections; and the two-dimensional function can have a first limit in the first function direction, a second limit in the second function direction, a third limit in the third function direction, and a fourth limit in the fourth function direction. The command processor can be configured to generate and send commands to command the two-dimensional machine function to the first limit when the first limit selection is activated based on touch by the operator, to generate and send commands to command the two-dimensional machine function to the second limit when the second limit selection is activated based on touch by the operator, to generate and send commands to command the two-dimensional machine function to the third limit when the third limit selection is activated based on touch by the operator, and to generate and send commands to command the two-dimensional machine function to the fourth limit when the fourth limit selection is activated based on touch by the operator. The first limit selection can be activated when the operator double-presses the first divider, the second limit selection can be activated when the operator double-presses the second divider, the third limit selection can be activated when the operator double-presses the third divider, and the fourth limit selection can be activated when the operator double-presses the fourth divider. Alternatively, each of the first, second, third and fourth dividers can include a proximal end closest to the intersection location and a distal end furthest from the intersection location; and the first limit selection can be activated when the operator presses the distal end of the first divider, the second limit selection can be activated when the operator presses the distal end of the second divider, the third limit selection can be activated when the operator presses the distal end of the third divider, and the fourth limit selection can be activated when the operator presses the distal end of the fourth divider.

The touchpad can also include a power connection to provide power from the machine to the surface, and signal connections to communicate control signals between the machine and the touchpad. The zones and dividers can share the power connection and the signal connections, and the command processor can send the commands to control each of the assigned machine functions over the signal connections.

A touchpad is disclosed for control of a machine by an operator where the machine has multiple functions. The touchpad includes a surface, an overlay, dividers, a control nub and a command processor. The surface is configured to sense touch by the operator. The overlay is positioned over the surface and forms zones on the surface, where one or more of the zones is an assigned zone. The dividers and control nub can be formed by the overlay and separate the surface into the zones, where one or more of the dividers is an assigned divider. Each of the assigned zones and dividers and the control nub is selectively configured to control an assigned machine function of the multiple functions of the machine. The command processor communicates with the zones and dividers and the control nub. The command processor is configured to generate and send commands to control each of the assigned machine functions based on touch by the operator of the assigned zones and dividers and the control nub.

The surface can be at a first height, the dividers can be at a second height, and the control nub can be at a third height, where the first, second, and third heights are different and the height difference is distinguishable based on touch.

The dividers can include a first divider and a second divider that lie on a first line, and a third divider and a fourth divider that lie on a second line, where the first and second lines are perpendicular and cross at an intersection location, and the control nub is located at the intersection location. The first divider can extend away from the control nub in a first touchpad direction, the second divider can extend away from the control nub in a second touchpad direction that is opposite the first touchpad direction, the third divider can extend away from the control nub in a third touchpad direction, and the fourth divider can extend away from the control nub in a fourth touchpad direction that is opposite the third touchpad direction.

The first, second, third and fourth dividers can be configured to function as a dual-axis joystick and assigned to control a two-dimensional function of the machine such that the command processor generates and sends commands to command the two-dimensional function in a first function direction based on touch by the operator of the first divider, in a second function direction based on touch by the operator of the second divider, in a third function direction based on touch by the operator of the third divider, and in a fourth function direction based on touch by the operator of the fourth divider. Each of the first, second, third and fourth dividers can include a proximal end closest to the control nub and a distal end furthest from the control nub; and the two-dimensional function can have a first limit in the first function direction, a second limit in the second function direction, a third limit in the third function direction, and a fourth limit in the fourth function direction. The command processor can be configured to generate and send commands to command the two-dimensional machine function to the first limit when the operator presses the distal end of the first divider, to generate and send commands to command the two-dimensional machine function to the second limit when the operator presses the distal end of the second divider, to generate and send commands to command the two-dimensional machine function to the third limit when the operator touches the distal end of the third divider, and to generate and send commands to command the two-dimensional machine function to the fourth limit when the operator touches the distal end of the fourth divider.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

A touchpad for fingers and thumb could replace joystick controls or other control mechanisms for controlling a machine. For example, each hydraulic function of the machine could be controlled by a touchpad where the touchpad can have multiple zones, and/or can be separated by an overlay or dividers into zones for operation of the machine. An overlay or dividers can enable intuitive operation of the machine without requiring the operator to take their eyes off of the task. The overlay and dividers can be physical or virtual. The dividers can form the overlay that separates the surface of the touchpad into zones. The dividers can include buttons, switches, dual-axis controls, raised partitions, or other touchpad features. The touchpad can have three-dimensional (3D) contours with areas for neutral or hold. Neutral could also be enabled by a double tap on the touchpad. The 3D curvature gradient of the touchpad can be a feel indicator for the magnitude of the command. Braille type raised features could also be used to ascertain magnitude of command by feel without requiring the operator to take their eyes off of the task. The controller could be configured with a combination of fingertip rollers and switches in conjunction with the touchpad, or with multiple touchpads.

Figure 1:
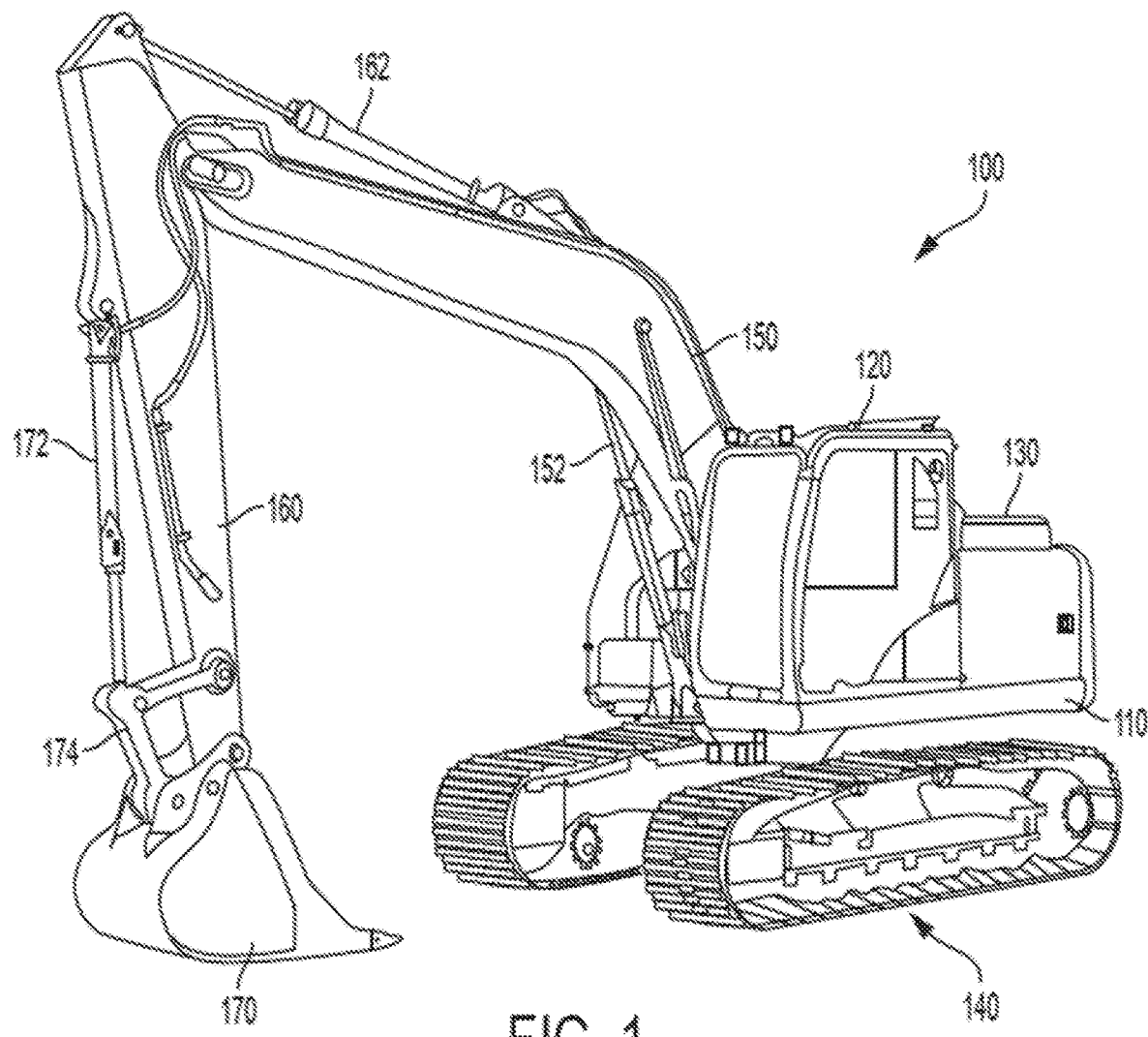
FIG. 1 illustrates an exemplary vehicle for touchpad machine control.

FIG. 1 illustrates an exemplary excavator 100 comprising a frame 110, an operator cab 120, an engine compartment and counterweight 130, traction devices 140, a boom 150, an arm 160 and a bucket 170. The operator cab 120, engine compartment and counterweight 130 and traction devices 140 are coupled to the frame 110. A proximal end of the boom 150 is pivotally coupled to the frame 110 and a distal end of the boom 150 is pivotally coupled to the arm 160. A proximal end of the arm 160 is pivotally coupled to the boom 150 and a distal end of the arm 160 is pivotally coupled to the bucket 170. A boom cylinder 152 has a proximal end coupled to the frame 110 and a distal end coupled to the boom 150. The boom cylinder 152 can be used to raise and lower the boom 150. An arm cylinder 162 has a proximal end coupled to the boom 150 and a distal end coupled to the arm 160. The arm cylinder 162 can be used to raise and lower the arm 160. A bucket cylinder 172 has a proximal end coupled to the arm 160 and a distal end coupled to bucket linkage 174 that is coupled to the bucket 170. The bucket cylinder 172 and bucket linkage 174 can be used to move the bucket 170.

Figure 2:
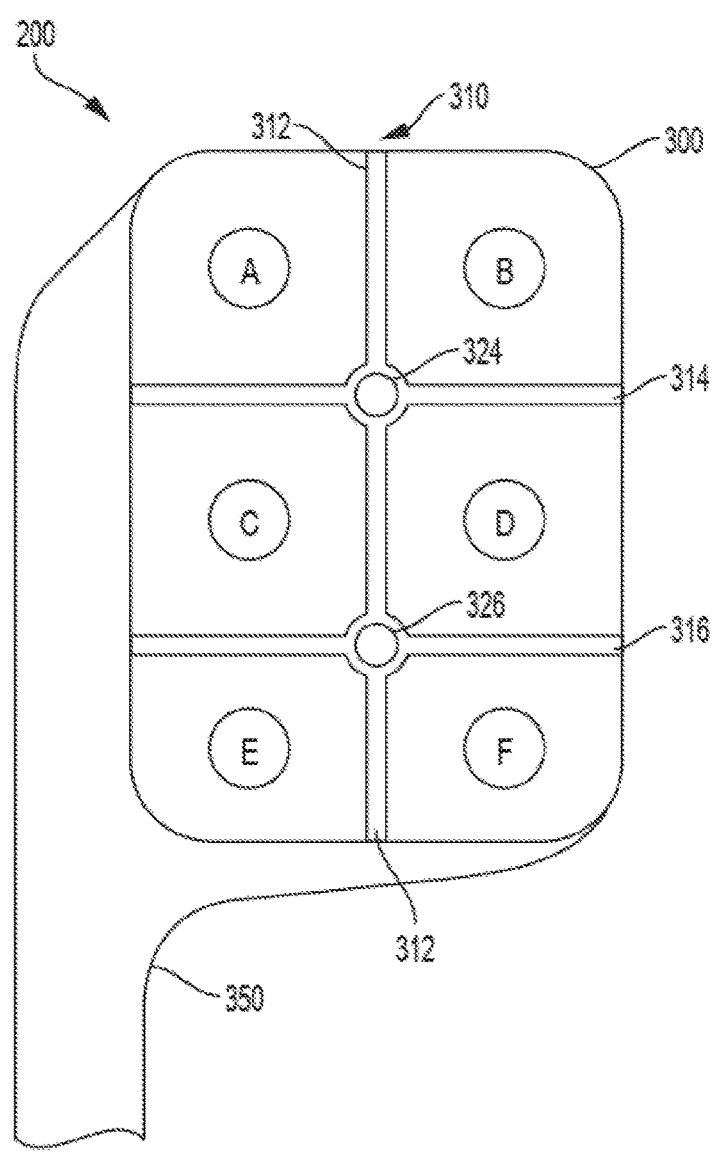
FIG. 2 illustrates an exemplary embodiment of a touchpad mounted on a control stick.
Figure 3:
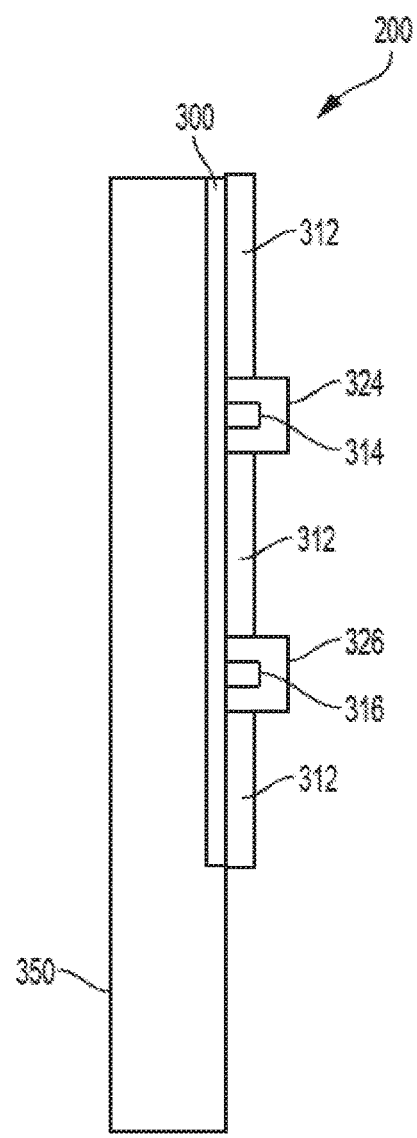
FIG. 3 illustrates a side view of the exemplary embodiment of the touchpad shown in FIG. 2.

FIGS. 2 and 3 illustrate an embodiment of a touchpad 200 that includes a surface 300 that is divided into a plurality of zones by an overlay or dividers 310. FIG. 2 shows a front view and FIG. 3 shows a side view of the touchpad 200. This exemplary embodiment shows the touchpad 200 mounted on a control stick 350. The touchpad 200 can be mounted on a movable base (for example, a control stick), or can be mounted on a stationary surface (for example, a dashboard). The surface 300 can be a display screen or another surface separated by the overlay 310. The surface 300 can sense the operator's touch by sensing capacitive changes of the surface 300 caused when the operator touches the surface 300 or the overlay 310. Alternatively, the surface 300 can sense the operator's touch by sensing mechanical pressure caused by the operator pressing on the surface 300 or the overlay 310. The surface 300 can also use other methods to sense touch by a user or operator. In the exemplary embodiment, the surface 300 is divided into six zones: A, B, C, D, E, F, by the overlay 310 that includes a vertical divider 312, a first horizontal divider 314 and a second horizontal divider 316. The overlay 310 also includes a first control nub 324 at the intersection of the vertical divider 312 and the first horizontal divider 314, and a second control nub 326 at the intersection of the vertical divider 312 and the second horizontal divider 316. The overlay 310 can be made of plastic or other material which is coupled to the touchpad 200. The overlay 310 provides separators that an operator can use to determine finger location by touch without having to look at the touchpad 200. In this exemplary embodiment, the vertical divider 312 and horizontal dividers 314, 316 are ridges that extend above the surface 300 by a first height (for example, 1-2 millimeters (mm)) and the control nubs 324, 326 extend above the surface 300 by a second height (for example, 2-4 mm) where the first and second heights are different. Alternatively, the touchpad 200 can have zones displayed or illuminated on the surface 300 without overlay or dividers, or the overlay and/or dividers can be virtual features displayed or illuminated on the surface 300 along with the zones.

As another alternative to having the overlay or dividers 310 being raised above the surface 300, the overlay 310 can be made of troughs in the surface 300 that an operator can feel to determine finger location without having to look at the touchpad 200. As another alternative, the overlay 310 can have a different surface texture from the zones A-F so the operator can use the texture of the overlay 310 to determine finger location by touch without having to look at the touchpad 200. For example, the overlay 310 can have a rough or pebbled surface and the zones A-F can have a smooth surface; or the overlay 310 can have a smooth surface and the zones A-F can have a rough or pebbled surface. Any of various combinations of different surface heights and textures can be used on the surface 300 and overlay 310 of the touchpad 200 to enable the operator to determine finger location without having to look at the touchpad 200. Similarly, instead of the control nubs 324, 326 protruding above the surface 300, the control nubs 324, 326 can be divots that sink below the surface 300 to enable the operator to determine finger location without having to look at the touchpad 200.

The terms "overlay" and "dividers" are generally used herein to refer to embodiments where the overlay and/or dividers extend above or below the surface, and/or where the overlay and/or dividers have different textures than the surface, or other embodiments where they provide a haptic distinction from the surface that is discernible by an operator. This enables the operator to find and follow any of the vertical and horizontal dividers 312, 314, 316; and to find the control nubs 324, 326, and the zones A-F; and to distinguish between the vertical and horizontal dividers 312, 314, 316, and the control nubs 324, 326, and the zones A-F; without having to look at the touchpad 200. The overlay 310 provides a haptic guide for the operator.

The overlay 310 can have more or less vertical and horizontal dividers to separate the surface 300 into more or less zones. For example, one vertical and one horizontal divider can separate the surface 300 into four zones; while two vertical and three horizontal dividers can separate the surface 300 into twelve zones. The control nubs 324, 326 and surrounding overlay 310 can provide joystick control of a selected function. An overlay can include a nub (like control nubs 324, 326) at some or all of the intersections of vertical and horizontal dividers, and/or an overlay can include control nubs at locations other than the intersections of vertical and horizontal dividers, and/or an overlay can be without control nubs.

Each of the zones A-F of the surface 300 can be a user-selectable function. The user-selectable functions can be assignable to the zones A-F by the operator. For example, when controlling the excavator 100, the control stick 350 can be used to control the direction and speed of travel of the tracks 140, zone A can be selected to control the rotation of the frame 110 relative to the tracks 140, zone B can be selected to control the raising and lowering of the boom 150, zone C can be selected to control the raising and lowering of the arm 160, zone D can be selected to control the movement of the bucket 170, and zones E and F can be selected to control other functions of the excavator 100. Alternatively, some of the zones A-F can be indicators or other controls/functions of the machine 100.

The operator can select one of the zones A-F to be associated with the first control nub 324, and another of the zones A-F to be associated with the second control nub 326. In embodiments where areas of the surface 300 or the overlay 310 can be illuminated, the selected zone can be more brightly illuminated when selected, and/or can be illuminated with different colors to show if it is associated with the first control nub 324 or with the second control nub 326. Thus, for example, if zone A is associated with rotation of the frame 110, zone B is associated with raising and lowering of the boom 150, zone C is associated with raising and lowering of the arm 160, and zone D is associated with moving of the bucket 170. Then the operator can select zone A and associate it with the first control nub 324, and select zone B and associate it with the second control nub 326 which would enable the operator to simultaneously control movement of the excavator 100 with the control stick 350, control movement of the frame 110 with the first control nub 324, and control movement of the boom 150 with the second control nub 326. At another time, the operator can select zone C and associate it with the first control nub 324, and select zone D and associate it with the second control nub 326 which would enable the operator to simultaneously control movement of the excavator 100 with the control stick 350, control movement of the arm 160 with the first control nub 324, and control movement of the bucket 170 with the second control nub 326. The operator could also select different combinations of zones to associate with the control nubs 324, 326.

The zones A-F can also control functionality not directly associated with the functionality controlled by the control nubs 324, 326. For example, zones A and B can control gear up and gear down, respectively, zone C can turn on/off automatic gear selection, zone D can activate transmission kick down, zone E can control a horn, and zone F can turn on/off differential lock. At the same time, the control nubs 324, 326 and overlay 310 can control first and second hydraulic functions as described below. The touchpad 200 can be configurable to assign other operator-selectable functionality to any or all of the zones A-F, the control nubs 324, 326 and the overlay 310.

The functions of the machine that are assigned to each of the zones A-F and control nubs 324, 326 of the touchpad 200 can be assignable by the operator using an assignment component of the touchpad 200. Each of the zones A-F and control nubs 324, 326 of the touchpad 200 can be an assignable control features that can be assigned to a selected function of the machine using the assignment component. The assignment of zones and nubs can be done individually or grouped in a profile. For example, if the machine being controlled was a front loader then the operator may select one set of functions of the machine (or a first profile) to associate with the assignable control features of the touchpad 200 when the front loader is being used to load a truck, and another set of functions of the machine (or a second profile) to associate with the assignable control features of the touchpad 200 when the front loader is being used for shoveling snow.

Figure 4:
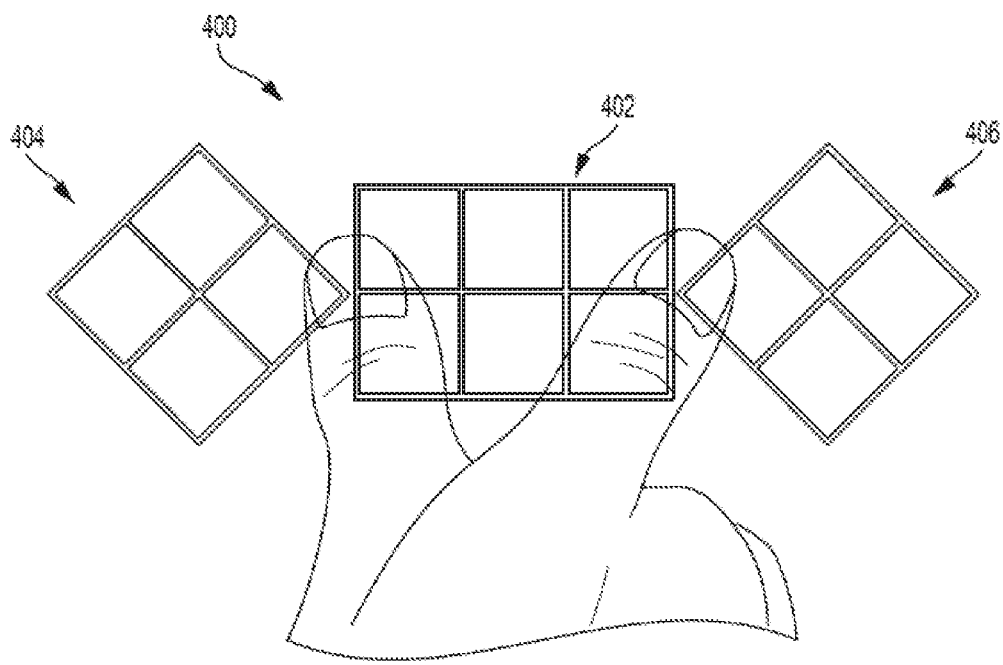
FIG. 4 illustrates thumb reach on a prior art control pad system that includes six buttons, and left and right dual-axis analog joysticks.
Figure 5:
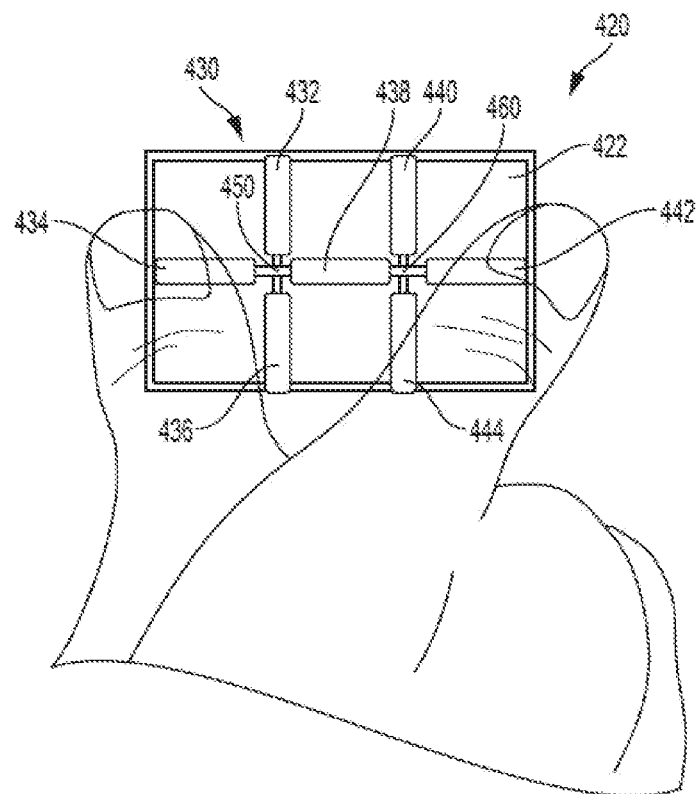
FIG. 5 illustrates thumb reach on an exemplary touchpad that can be configured to have equivalent functionality to six buttons, and left and right dual-axis analog joysticks.

FIGS. 4 and 5 compare a prior art control pad system 400 and an alternative embodiment of a touchpad 420 according to the present invention to more clearly illustrate some of the benefits of the system. Each of the systems 400, 420 can have similar functionality to the touchpad 200.

The control pad system 400 includes a button pad 402 with six buttons, a left dual-axis analog joystick 404 and a right dual-axis analog joystick 406. Thus a user can select any combination of the buttons of the button pad 402, and can move either of the left and right joysticks 404, 406 in the up/down/right/left directions to control various functions. As illustrated in FIG. 4, it may be difficult or impossible, to layout the button pad 402, and joysticks 404, 406 so that the user can reach and effectively use all of them simultaneously without having to move their hand or use two hands. In addition, the eight separate components (six separate buttons of button pad 402 plus two joysticks 404, 406) of the control pad system 400 would require power and ground wires in addition to signal wires for each component, which likely means twenty or more wires for the wiring harness of the control pad system 400.

The touchpad 420 includes surface 422 separated into six zones by an overlay 430. Each of the six zones of the touchpad 420 can be independently selected by a user. The overlay 430 include a first set of dividers 432, 434, 436, 438 that can provide the functionality of a first dual-axis joystick; and a second set of dividers 438, 440, 442, 444 that can provide the functionality of a second dual-axis joystick. Thus, the touchpad 420 can provide the functionality of the eight separate components of the control pad system 400 with the touchpad 420 and overlay 430. As illustrated in FIG. 5, it is easier for the user to reach and effectively use all of the functionality of the touchpad 420 using one thumb without otherwise moving their hand. This greater ease of use and control compared to the prior art control pad system 400 provides a more ergonomic and desirable user experience. In addition, the touchpad 420 can be implemented so as to require only powering one component, thus one power and one ground, and an x-y coordinate to indicate where the operator is touching the touchpad 420, which can mean as few as four wires for the wiring harness. The various assignable control features of the touchpad 420, including the zones and dividers, can share the signal wires of the surface 422. This reduction in the number of wires in the wiring harness compared to the prior art control pad system 400 enables easier assembly and maintenance as well as greater reliability for the touchpad 420.

Figure 6:
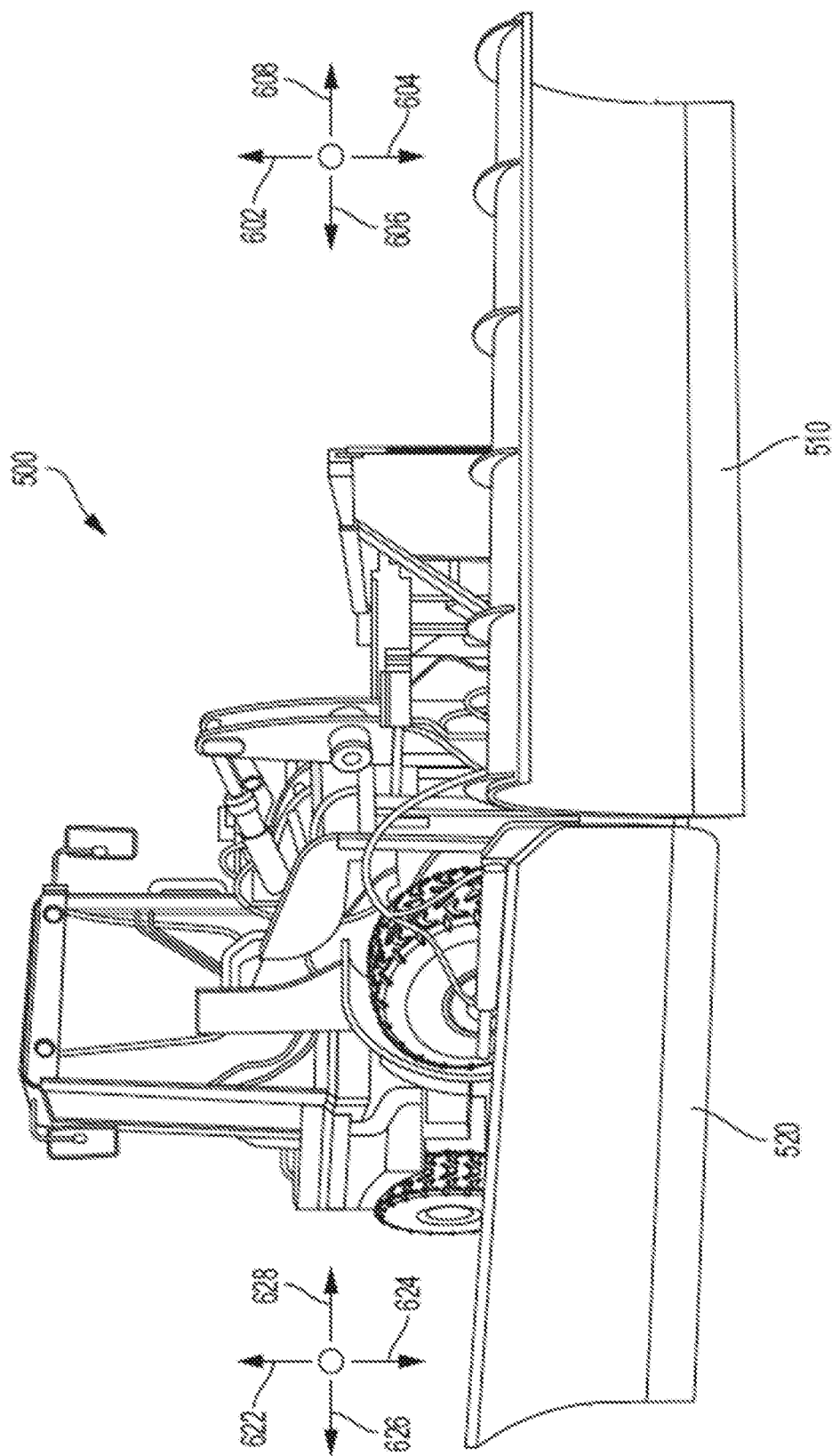
FIG. 6 illustrates an exemplary machine with first and second implements that can be independently controlled by an operator using a touchpad.

FIG. 6 shows an example of a machine 500 with a first implement 510 and a second implement 520 that can be independently controlled by an operator. In this example, the machine is a loader 500, the first implement is a main plow 510 and the second implement is a wing plow 520. The main and wing plows 510, 520 can be examples of two-dimensional machine functions where they can be controlled to move up-and-down, or right-and left. The machine 500 can be equipped with any of various embodiments of a touchpad as disclosed herein, such as for example touchpad 200 or 420.

Figure 7:
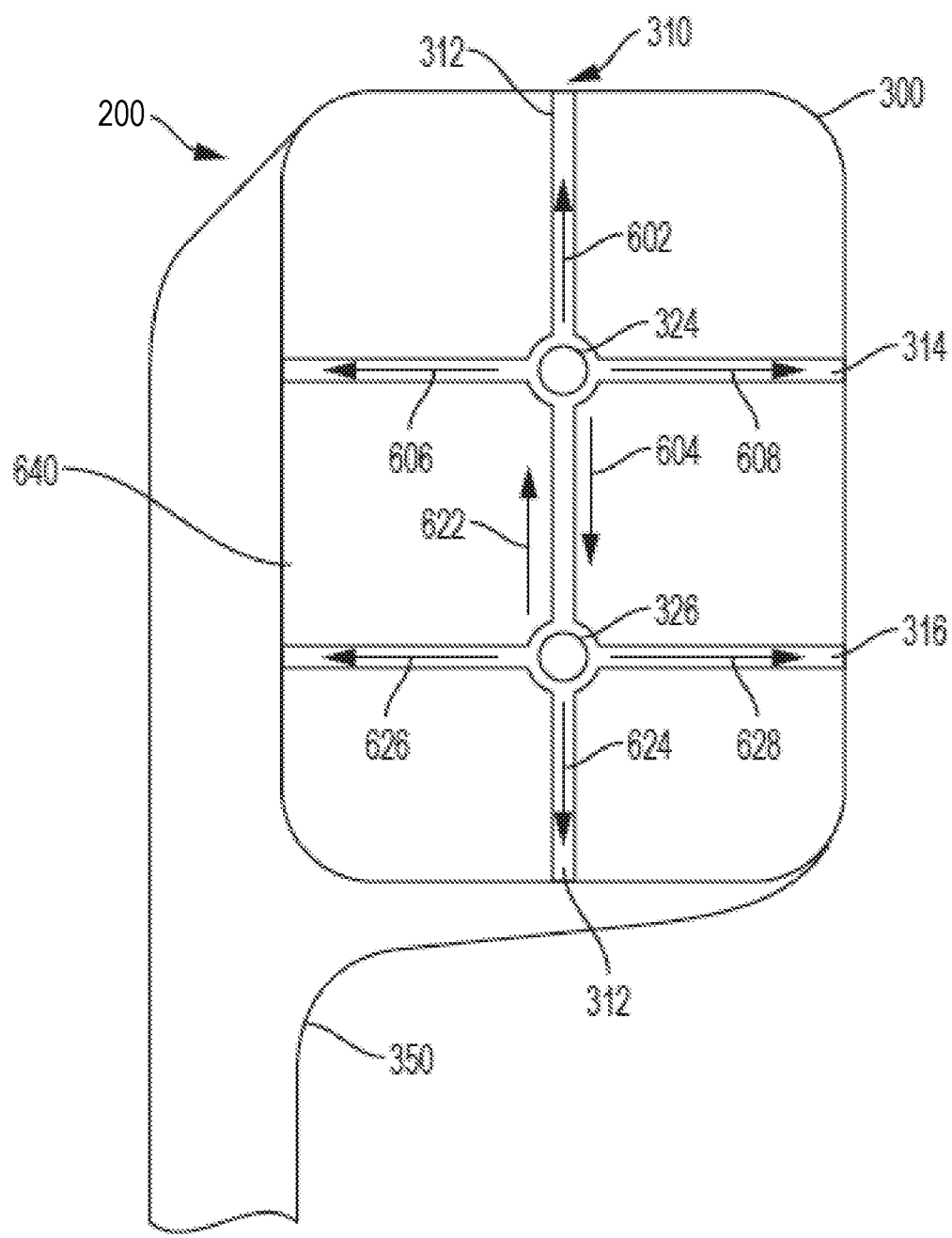
FIG. 7 illustrates an exemplary touchpad configuration for controlling the first and second implements of the machine in FIG. 6.

If the machine 500 is equipped with the touchpad 200, the control nubs 324, 326 and overlay 310 can be configured to control both the first and second implements 510, 520. The first control nub 324, the first horizontal divider 314 and the upper portion of the vertical divider 312 above the second control nub 326 can be associated with the main plow 510. The second control nub 326, the second horizontal divider 316 and the lower portion of the vertical divider 312 below the first control nub 324 can be associated with the wing plow 520. FIG. 7 illustrates an example with this configuration for the machine 500 shown in FIG. 6. Corresponding arrows are shown in FIGS. 6 and 7 to indicate the plow movement that corresponds with the touchpad control. When the operator touches the overlay 310 at or near the first control nub 324 and slides their thumb to the left where indicated by arrow 606 along the first horizontal divider 314, then a command processor of the touchpad 200 can be configured to generate and send commands to the main plow 510 to turn further to the left. When the operator touches the overlay 310 at or near the first control nub 324 and slides their thumb to the right where indicated by arrow 608 along the first horizontal divider 314, then the command processor of the touchpad 200 can be configured to generate and send commands to the main plow 510 to turn further to the right. When the operator touches the overlay 310 at or near the first control nub 324 and slides their thumb up where indicated by arrow 602 along the vertical divider 312, then the command processor of the touchpad 200 can be configured to generate and send commands to the main plow 510 to raise further away from the ground. When the operator touches the overlay 310 at or near the first control nub 324 and slides their thumb down where indicated by arrow 604 along the vertical divider 312, then the command processor of the touchpad 200 can be configured to generate and send commands to the main plow 510 to lower further towards the ground.

The operations of the wing plow 520 can work similarly with the overlay 310 about the second control nub 326. When the operator touches the overlay 310 at or near the second control nub 326 and slides their thumb to the left where indicated by arrow 626 along the second horizontal divider 316, then the command processor of the touchpad 200 can be configured to generate and send commands to the wing plow 520 to turn further to the left. When the operator touches the overlay 310 at or near the second control nub 326 and slides their thumb to the right where indicated by arrow 628 along the second horizontal divider 316, then the command processor of the touchpad 200 can be configured to generate and send commands to the wing plow 520 to turn further to the right. When the operator touches the overlay 310 at or near the second control nub 326 and slides their thumb up where indicated by arrow 622 along the vertical divider 312, then the command processor of the touchpad 200 can be configured to generate and send commands to the wing plow 520 to raise further away from the ground. When the operator touches the overlay 310 at or near the second control nub 326 and slides their thumb down where indicated by arrow 624 along the vertical divider 312, then the command processor of the touchpad 200 can be configured to generate and send commands to the wing plow 520 to lower further towards the ground. The touchpad 200 can determine the direction of the operator touch based on the starting location where the operator initially touches the touchpad 200 and the direction the operator touch moves from that starting location. In this way, the touchpad 200 can distinguish lowering of the main plow 510 and raising of the wing plow 520 which both involve touching the vertical divider 312 between the first control nub 324 and the second control nub 326.

If the machine 500 is equipped with the touchpad 420, the dividers of the overlay 430 can be configured to control both the first and second implements 510, 520. The dividers 432-438 can form a first joystick associated with the main plow 510. The dividers 432-438 have a different height, a different texture, or other haptic distinction from the surface 422 which enables an operator to haptically sense these dividers 432-438 and also where they meet at first intersection 450. The dividers 438-444 can form a second joystick associated with the wing plow 520. The dividers 438-444 have a different height, a different texture, or other haptic distinction from the surface 422 which enables the operator to haptically sense these dividers 438-444 and also where they meet at second intersection 460. The touchpad 420 does not have the control nubs of touchpad 200, however the intersections 450, 460 of the first and second virtual joysticks can still be determined by feel. If the dividers 432-444 extend above the surface 422, then intersections 450, 460 can feel like divots if the dividers do not meet or like a raised cross if they do meet. If the dividers 432-444 are below the surface 422, then intersections 450, 460 can feel like bumps if the dividers do not meet or like a sunken cross if they do meet. If the dividers 432-444 have a different texture than the surface 422, then intersections 450, 460 can feel like small areas with the texture of the surface 422 surrounded by areas with the texture of the dividers if the dividers do not meet, or like a cross with the texture of the dividers if the dividers do meet.

An example of controlling the plows 510, 520 of the machine 500 with the touchpad 420 is as follows where dividers 432-438 are grouped to form the first joystick associated with the main plow 510, and the dividers 438-444 are grouped to form a second joystick associated with the wing plow 520. When the operator touches the overlay 430 at or near the first intersection 450 and slides their thumb to the left along the horizontal divider 434, then the command processor of the touchpad 200 can be configured to generate and send commands to the main plow 510 to turn further to the left. When the operator touches the overlay 430 at or near the first intersection 450 and slides their thumb to the right along the horizontal divider 438, then the command processor of the touchpad 200 can be configured to generate and send commands to the main plow 510 to turn further to the right. When the operator touches the overlay 430 at or near the first intersection 450 and slides their thumb up along the vertical divider 432, then the command processor of the touchpad 200 can be configured to generate and send commands to the main plow 510 to raise further away from the ground. When the operator touches the overlay 430 at or near the first intersection 450 and slides their thumb down along the vertical divider 436, then the command processor of the touchpad 200 can be configured to generate and send commands to the main plow 510 to lower further towards the ground. The operations of the wing plow 520 can work similarly with the overlay 430 about the second intersection 460. When the operator touches the overlay 430 at or near the second intersection 460 and slides their thumb to the left along the horizontal divider 438, then the command processor of the touchpad 200 can be configured to generate and send commands to the wing plow 520 to turn further to the left. When the operator touches the overlay 430 at or near the second intersection 460 and slides their thumb to the right along the horizontal divider 442, then the command processor of the touchpad 200 can be configured to generate and send commands to the wing plow 520 to turn further to the right. When the operator touches the overlay 430 at or near the second intersection 460 and slides their thumb up along the vertical divider 440, then the command processor of the touchpad 200 can be configured to generate and send commands to the wing plow 520 to raise further away from the ground. When the operator touches the overlay 430 at or near the second intersection 460 and slides their thumb down along the vertical divider 444, then the command processor of the touchpad 200 can be configured to generate and send commands to the wing plow 520 to lower further towards the ground. The touchpad 420 can determine the direction of the operator touch based on the starting location where the operator initially touches the touchpad 420 and the direction the operator touch moves from that starting location. In this way, the touchpad 420 can distinguish moving the main plow 510 to the right and moving the wing plow 520 to the left which both involve touching the horizontal divider 438 between the first intersection 450 and the second intersection 460.

When a vehicle function has a limit, such as movement of one of the plows 510, 520 of FIG. 6 in a particular direction, or fully opening or fully closing a grapple, a touchpad can be configured to command the function limit without requiring the operator to continuously hold the control element. For example, a double-press or double-click of a portion of the overlay 310 that has a single function can indicate that the operator wants to command the function limit. A double-press or double-click is when the operator presses twice in rapid succession. Referring to FIG. 7, the vertical divider 312 above the first control nub 324 is associated with raising the main plow 510 further from the ground. Thus, the touchpad 200 can be configured such that when the operator double-clicks the vertical divider 312 above the first control nub 324 (anywhere along arrow 602), the command processor of the touchpad 200 can be configured to generate and send commands to raise the main plow 510 until it reaches its movement limit. Similarly, the touchpad 200 can be configured such that double-clicking or double-pressing one of zones A-F can command the function associated with that zone to go to the function limit.

As an alternative for commanding a function limit, a touchpad can be configured such that touching a portion of the overlay that has a single function all of the way to the end of that portion of the overlay can indicate that the operator wants to command the function limit. For example, the second horizontal divider 316 on the left side of the second control nub 326 is associated with moving the wing plow 520 further to the left side of the machine 500. Thus, the touchpad 200 can be configured such that when the operator touches the second horizontal divider 316 at or near the second control nub 326 and continuously touches the second horizontal divider 316 while moving the touching location to the left edge 640 of the surface 300 along arrow 626, the command processor of the touchpad 200 can be configured to generate and send commands to move the wing plow 520 to the left until it reaches its movement limit.

A touchpad can be configured such that active areas are illuminated and inactive areas are not illuminated. For example, referring to FIG. 7, if the first control nub 324 and surrounding portions of the overlay 310 are active to control a function then the portions of the overlay 310 associated with arrows 602, 604, 606, 608 can be illuminated, for example by being lit or backlit. The illumination can be a particular active color, for example green illumination. If the second control nub 326 and associated portions of the overlay 310 are inactive, not currently associated with control of a function, then the portions of the overlay 310 associated with arrows 624, 626, 628 can be unilluminated or illuminated in an inactive color, for example red illumination. Note that in this example, the middle portion of the vertical divider 312 associated with arrows 604 and 622 would be illuminated as active. The overlay 310 can be transparent to make illumination or backlighting more visible. Alternatively, the lighting can be embedded in the various dividers of the overlay 310. Similarly, the touchpad 200 can be configured such that active zones A-F are illuminated and inactive zones are not illuminated. In addition, when an active portion of the overlay 310 or an active zone A-F is selected by the operator, the selected portion can be illuminated brighter or another color to indicate that that function is or has been selected by the operator.

Figure 8:
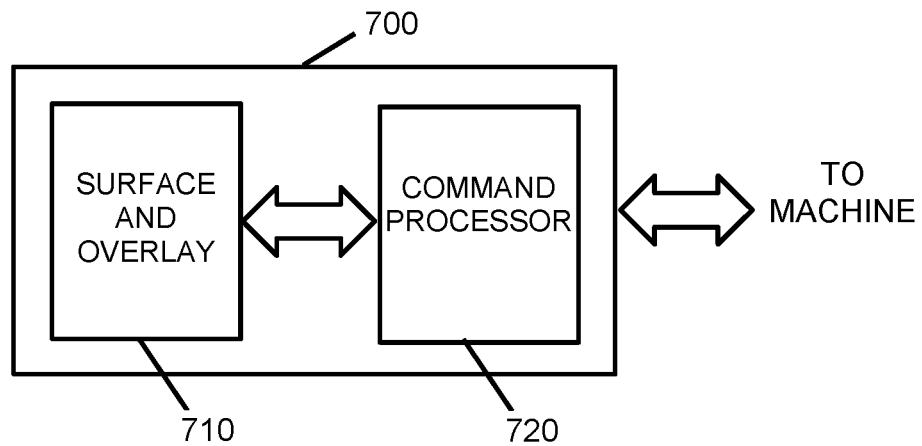
FIG. 8 illustrates a high level block diagram of an exemplary touchpad that includes a surface and overlay, and a command processor that communicates with a machine.

FIG. 8 illustrates a high level block diagram of an exemplary touchpad 700 that includes a surface and overlay 710 and a command processor 720. The surface and overlay 710 present the operator with zones and dividers for control of the vehicle. The surface and overlay 710 can include various input and output capabilities, including for example touch sensors, backlighting, displays, etc. The command processor 720 is in communication with the surface and overlay 710 to receive operator inputs from the surface and overlay 710 and to send feedback and commands to the surface and overlay 710. The touchpad 700 is in communication with the machine to send commands to control machine functions and to receive feedback, data and power from the machine.

FIGS. 9-17 show various alternative embodiments of touchpads according to the present disclosure that can be used to control various types of vehicles, including for example the vehicle 100 of FIG. 1 or the vehicle 500 of FIG. 6. In each of these exemplary embodiments, the touchpad includes a surface and an overlay that enables an operator to sense finger or thumb position due to differences in texture, height or other attributes without having to look at the touchpad. The touchpad can use capacitive and/or pressure and/or other sensing techniques to determine the area of the touchpad being activated by the operator. The surface can be a display or a non-display surface. The surface and overlay can have illumination, and can have any or all of the attributes described herein. Each of the embodiments can be sized to enable an operator to reach and effectively use any area of the surface and overlay to control the vehicle without having to move their hand position.

Figure 9:
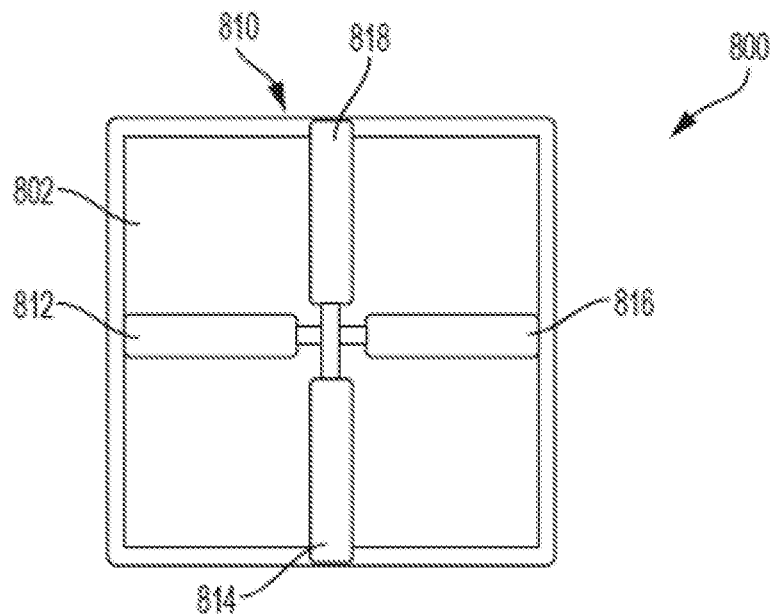
FIG. 9 illustrates a touchpad that includes a surface separated into four zones by an overlay.

FIG. 9 illustrates a touchpad 800 that includes a surface 802 separated into four zones by an overlay 810. Each of the zones of the touchpad 800 can be independently selected by a user. The overlay 810 includes dividers 812, 814, 816, 818 that can provide the functionality of a dual-axis joystick.

Figure 10:
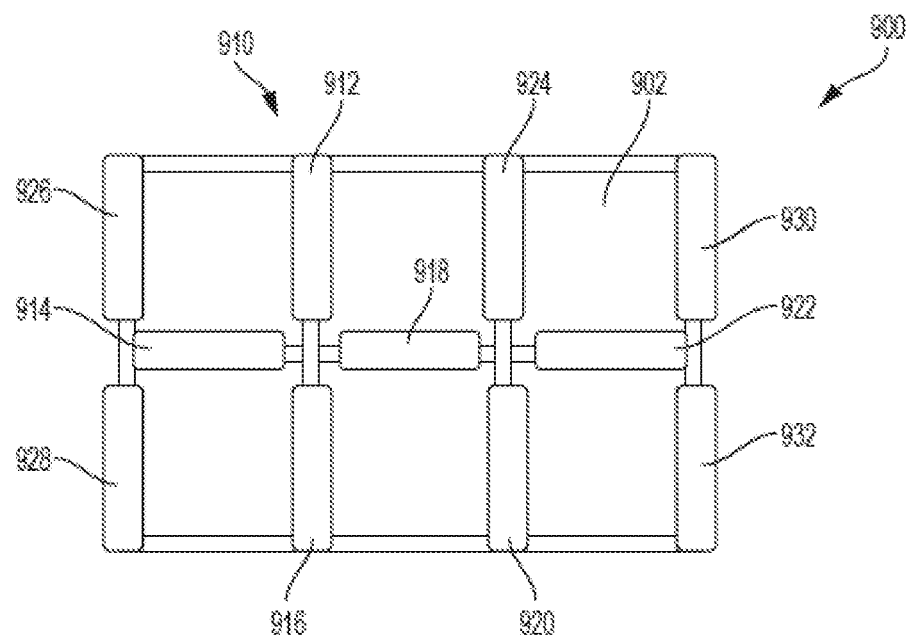
FIG. 10 illustrates a touchpad that includes a surface separated into six zones by an overlay with additional single axis controls on the outside vertical edges.

FIG. 10 illustrates a touchpad 900 that includes a surface 902 separated into six zones by an overlay 910. The touchpad 900 is similar to the touchpad 420 described above with the addition of single axis control on the outside vertical edges. Single axis control could also be introduced on the horizontal edges of the touchpad 900. Each of the zones of the touchpad 900 can be independently selected by a user. The overlay 910 includes dividers 912-932. The dividers can be grouped such that the four dividers 912-918 can provide the functionality of a first dual-axis joystick, and the four dividers 918-924 can provide the functionality of a second dual-axis joystick, and the two dividers 926, 928 can provide the functionality of a first single-axis joystick, and the two dividers 930, 932 can provide the functionality of a second single-axis joystick. Alternatively, the dividers 912-932 can be grouped into other configurations that can be determined by the operator.

Figure 11:
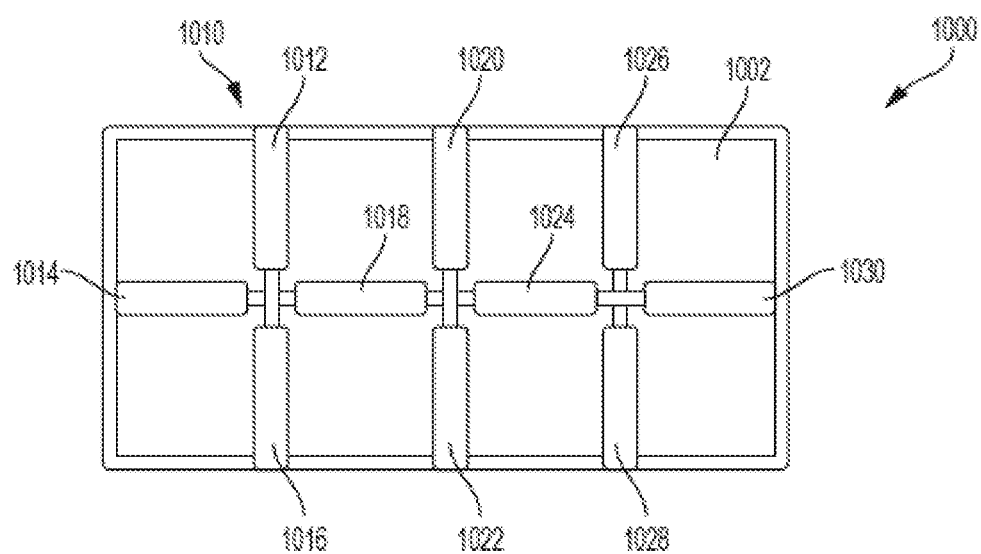
FIG. 11 illustrates a touchpad that includes a surface separated into eight zones by an overlay.

FIG. 11 illustrates a touchpad 1000 that includes a surface 1002 separated into eight zones by an overlay 1010. Each of the zones of the touchpad 1000 can be independently selected by a user. The overlay 1010 includes dividers 1012-1030. The dividers can be grouped such that the four dividers 1012-1018 can provide the functionality of a first dual-axis joystick, and the four dividers 1018-1024 can provide the functionality of a second dual-axis joystick, and the four dividers 1024-1030 can provide the functionality of a third dual-axis joystick by sharing the dividers 1018 and 1030. Alternatively, the dividers can be grouped such that the four dividers 1012-1018 can provide the functionality of a first dual-axis joystick, and the four dividers 1024-1030 can provide the functionality of a second dual-axis joystick, and the two dividers 1020-1022 can provide the functionality of a single-axis joystick without sharing any of the dividers between the joysticks. The dividers 1012-1030 can be grouped into other configurations that can be determined by the operator.

Figure 13:
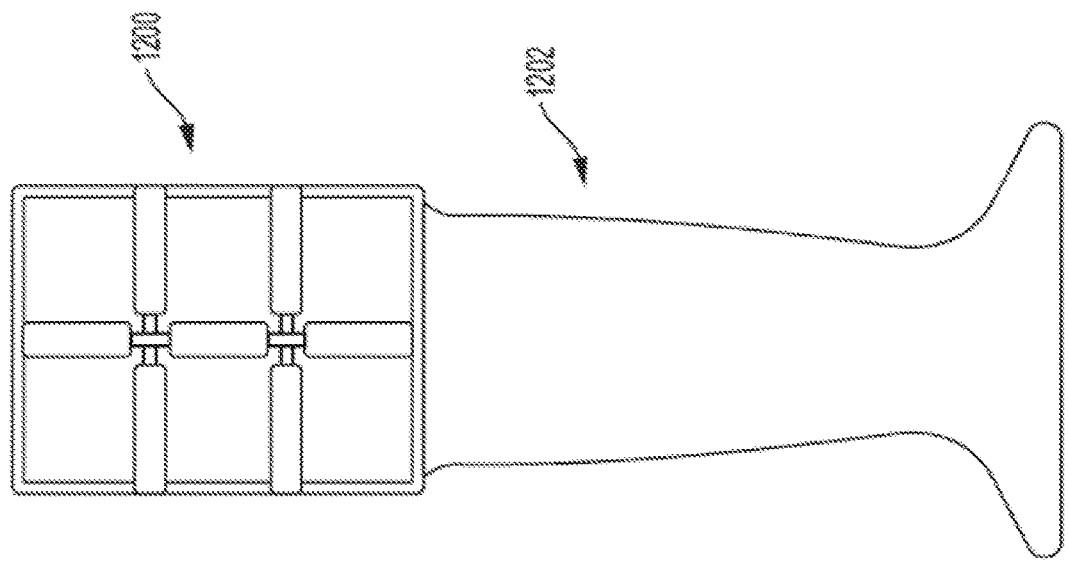
FIG. 13 illustrates a touchpad mounted in a vertical configuration on a stand or control stick.
Figure 12:
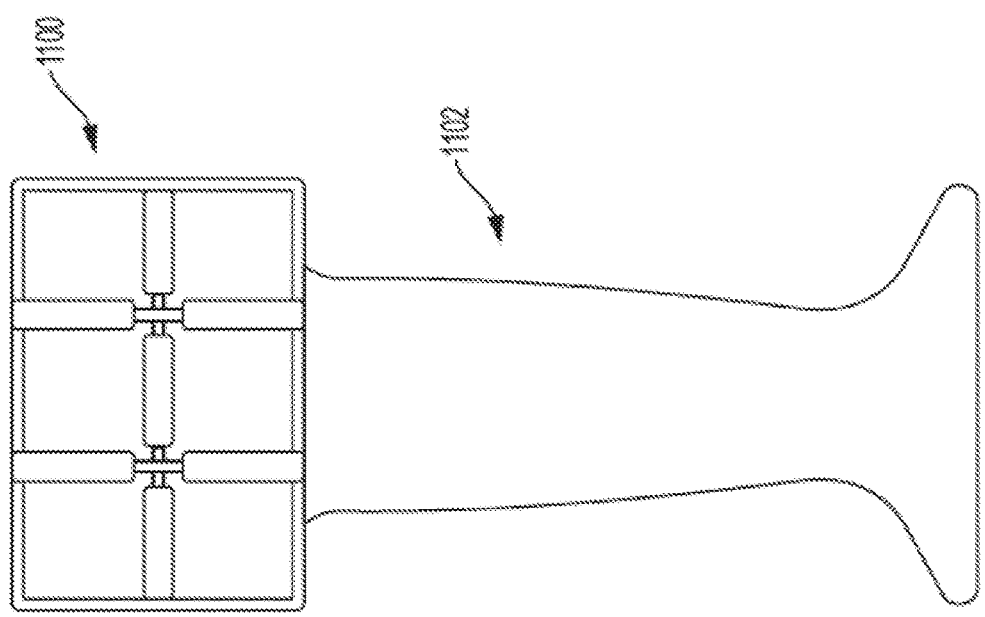
FIG. 12 illustrates a touchpad mounted in a horizontal configuration on a stand or control stick.

FIGS. 12 and 13 illustrate alternative embodiments of a touchpad mounted on a stand or a control stick. FIG. 12 illustrates a touchpad 1100 mounted in a horizontal configuration on a stand or control stick 1102. FIG. 13 illustrates a touchpad 1200 mounted in a vertical configuration on a stand or control stick 1202. The stands or control sticks 1102, 1202 can be stationary or can movable by the operator. Movement of the control sticks 1102, 1202 can control operations of the vehicle. The mounting of the touchpads 1100, 1200 can be fixed, or can be rotatable so that an operator can rotate a touchpad between the horizontal and vertical configurations. The touchpads 1100, 1200 are exemplary, and any size or configuration of touchpad can be mounted on the stands or control sticks 1102, 1202.

Figure 14:
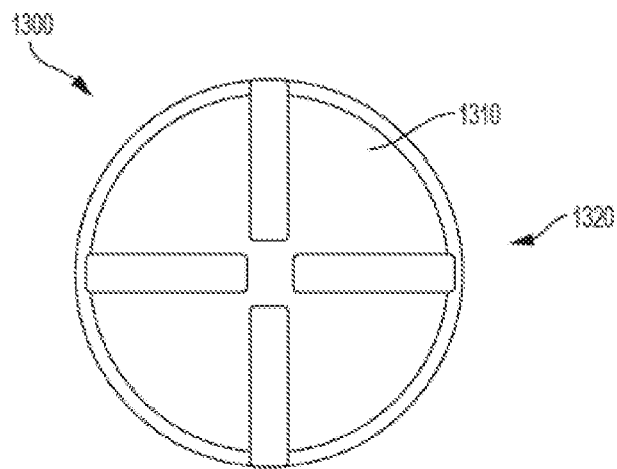
FIG. 14 illustrates a touchpad that includes a circular-shaped surface separated into four zones by an overlay that generally is along the vertical and horizontal diameters of the circle.
Figure 15:
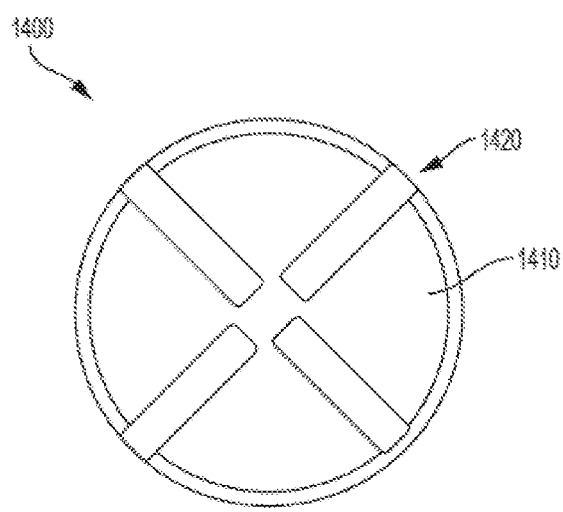
FIG. 15 illustrates a touchpad that includes a circular-shaped surface separated into four zones by an overlay that generally is along the forty-five degree diagonal diameters of the circle.

FIGS. 14-17 illustrate that the touchpads can have various different shapes and are not be limited to squares and rectangles. These touchpads can include any of the features described herein. FIG. 14 illustrates a touchpad 1300 that includes a circular-shaped or round surface 1310 separated into four zones by an overlay 1320 that generally is along the vertical and horizontal diameters of the surface 1310. FIG. 15 illustrates a touchpad 1400 that includes a circular-shaped or round surface 1410 separated into four zones by an overlay 1420 that generally is along the forty-five degree diagonal diameters of the surface 1410.

Figure 16:
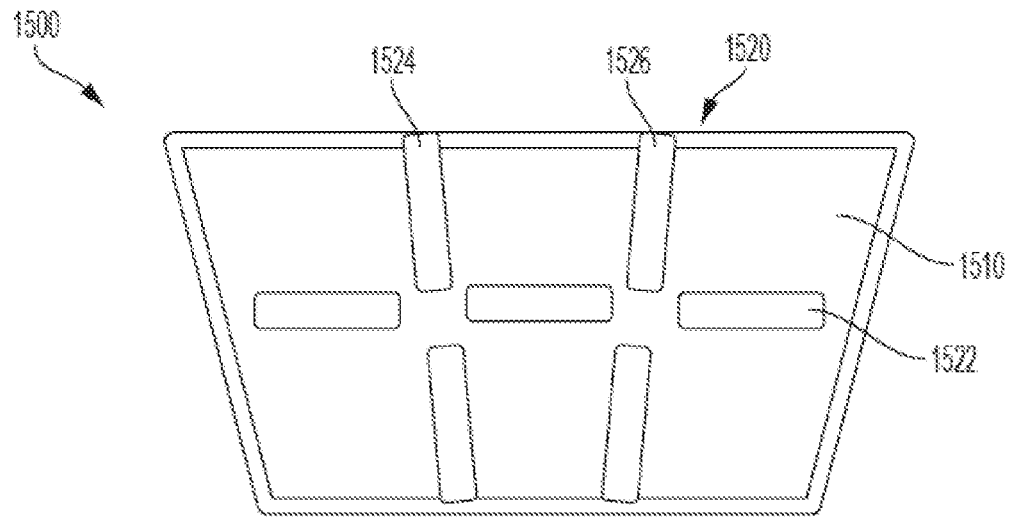
FIG. 16 illustrates a touchpad that includes a trapezoid-shaped surface separated into six zones by an overlay.

FIG. 16 illustrates a touchpad 1500 that includes a trapezoid-shaped surface 1510 separated into six zones by an overlay 1520. The overlay 1520 includes three horizontal dividers 1522, two left vertical dividers 1524 and two right vertical dividers 1526. The horizontal dividers 1522 are generally parallel to the top and bottom edges of the surface 1510. The left vertical dividers 1524 are generally parallel to the left edge of the surface 1510. The right vertical dividers 1526 are generally parallel to the right edge of the surface 1510. As with the touchpad 420 of FIG. 5, the dividers of the overlay 1520 can be grouped to provide the functionality of two dual-axis joysticks. The trapezoidal shape of the touchpad 1500 may make it easier for the operator to activate the various functions of the touchpad 1500 without repositioning their hand.

Figure 17:
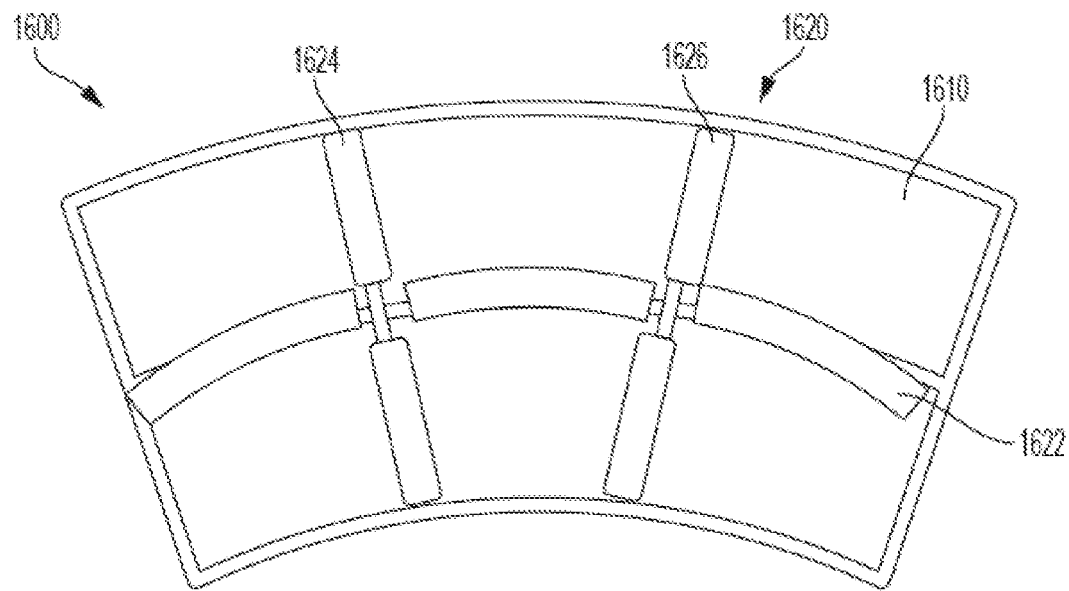
FIG. 17 illustrates a touchpad that includes an arc-shaped surface separated into six zones by an overlay.

FIG. 17 illustrates a touchpad 1600 that includes an arc-shaped surface 1610 separated into six zones by an overlay 1620. The overlay 1620 includes three arc-shaped horizontal dividers 1622, two left vertical dividers 1624 and two right vertical dividers 1626. The arc-shaped horizontal dividers 1622 are generally parallel to the top and bottom edges of the arc-shaped surface 1610. The left vertical dividers 1624 are generally parallel to the left edge of the arc-shaped surface 1610. The right vertical dividers 1626 are generally parallel to the right edge of the arc-shaped surface 1610. As with the touchpad 420 of FIG. 5, the dividers of the overlay 1620 can be grouped to provide the functionality of two dual-axis joysticks. The arc shape of the touchpad 1600 may make it easier for the operator to activate the various functions of the touchpad 1600 without repositioning their hand as it may more closely match the curvature of the thumb swipe of the operator.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A touchpad for control of a machine by an operator where the machine has a plurality of functions, the touchpad comprising:
   a surface configured to sense touch by the operator;
   a plurality of zones disposed on the surface, where one or more of the plurality of zones is an assigned zone, and each of the assigned zones is selectively configured to control an assigned machine function of the plurality of functions;
   a plurality of dividers disposed on the surface, where the plurality of dividers separate the surface into the plurality of zones, and where one or more of the plurality of dividers is an assigned divider, and each of the assigned dividers is selectively configured to control an assigned machine function of the plurality of functions; and
   a command processor disposed in communication with the plurality of zones and the plurality of dividers, the command processor configured to generate and send commands to control each of the assigned machine functions based on touch by the operator of the assigned zones and the assigned dividers.

2. The touchpad of claim 1, wherein the surface is configured to sense touch by the operator based on capacitive changes due to touch by the operator.

3. The touchpad of claim 1, wherein the surface is configured to sense touch by the operator based on mechanical pressure changes due to touch by the operator.

4. The touchpad of claim 1, wherein the surface comprises a display screen.

5. The touchpad of claim 1, wherein the touchpad is mounted on a control stick, where the control stick is movable by the operator to control one of the plurality of functions of the machine.

6. The touchpad of claim 1, wherein the plurality of dividers are at a different height than the surface, and the height difference is distinguishable based on touch.

7. The touchpad of claim 1, wherein the surface has a first texture and the plurality of dividers have a second texture, where the first texture is distinguishable from the second texture based on touch.

8. The touchpad of claim 1, wherein the surface is configured to illuminate in a first color each of the assigned zones and dividers, and not to illuminate in the first color any of the plurality of zones and dividers that are not assigned zones and dividers.

9. The touchpad of claim 8, wherein the surface is configured to illuminate in a second color each of the assigned zones and dividers that is currently activated or selected by the operator.

10. The touchpad of claim 1, wherein the plurality of dividers comprise:
a first divider and a second divider that lie on a first line, and
a third divider and a fourth divider that lie on a second line,
wherein the first and second lines are perpendicular and cross at an intersection location, the first divider extends away from the intersection location in a first touchpad direction, the second divider extends away from the intersection location in a second touchpad direction that is opposite the first touchpad direction, the third divider extends away from the intersection location in a third touchpad direction, and the fourth divider extends away from the intersection location in a fourth touchpad direction that is opposite the third touchpad direction.

11. The touchpad of claim 10, where the plurality of functions includes a two-dimensional machine function; and the first, second, third and fourth dividers are configured to function as a dual-axis joystick and assigned to control the two-dimensional machine function;
such that the command processor is configured to generate and send commands to command the two-dimensional machine function in a first function direction based on touch by the operator of the first divider, is configured to generate and send commands to command the two-dimensional machine function in a second function direction based on touch by the operator of the second divider, is configured to generate and send commands to command the two-dimensional machine function in a third function direction based on touch by the operator of the third divider, and is configured to generate and send commands to command the two-dimensional machine function in a fourth function direction based on touch by the operator of the fourth divider; where the second function direction is opposite of the first function direction, and the fourth function direction is opposite of the third function direction.

12. The touchpad of claim 11, further comprising first, second, third and fourth limit selections; and
wherein the two-dimensional machine function has a first limit in the first function direction, a second limit in the second function direction, a third limit in the third function direction, and a fourth limit in the fourth function direction; and
the command processor is configured to generate and send commands to command the two-dimensional machine function to the first limit when the first limit selection is activated based on touch by the operator, is configured to generate and send commands to command the two-dimensional machine function to the second limit when the second limit selection is activated based on touch by the operator, is configured to generate and send commands to command the two-dimensional machine function to the third limit when the third limit selection is activated based on touch by the operator, and is configured to generate and send commands to command the two-dimensional machine function to the fourth limit when the fourth limit selection is activated based on touch by the operator.

13. The touchpad of claim 12, wherein the first limit selection is activated when the operator double-presses the first divider, the second limit selection is activated when the operator double-presses the second divider, the third limit selection is activated when the operator double-presses the third divider, and the fourth limit selection is activated when the operator double-presses the fourth divider.

14. The touchpad of claim 1, further comprising:
a power connection to provide power from the machine to the surface, and
a plurality of signal connections to communicate control signals between the machine and the touchpad;
wherein the plurality of zones and dividers share the power connection and the plurality of signal connections, and the command processor sends the commands to control each of the assigned machine functions over the plurality of signal connections.

15. A touchpad for control of a machine by an operator where the machine has a plurality of functions, the touchpad comprising:
a surface configured to sense touch by the operator;
an overlay positioned over the surface and which forms a plurality of zones on the surface, where one or more of the plurality of zones is an assigned zone;
a plurality of dividers and a control nub formed by the overlay and which separate the surface into the plurality of zones, where one or more of the plurality of dividers is an assigned divider, and each of the assigned zones and dividers and the control nub is selectively configured to control an assigned machine function of the plurality of functions; and
a command processor disposed in communication with the plurality of zones and dividers and the control nub, the command processor configured to generate and send commands to control each of the assigned machine functions based on touch by the operator of the assigned zones and dividers and the control nub.

16. The touchpad of claim 15, wherein the surface is at a first height, the plurality of dividers are at a second height, and the control nub is at a third height, where the first, second, and third heights are different and the height difference is distinguishable based on touch.

17. The touchpad of claim 15, wherein the plurality of dividers comprise:
a first divider and a second divider that lie on a first line, and
a third divider and a fourth divider that lie on a second line,
wherein the first and second lines are perpendicular and cross at an intersection location, and the control nub is located at the intersection location; and
wherein the first divider extends away from the control nub in a first touchpad direction, the second divider extends away from the control nub in a second touchpad direction that is opposite the first touchpad direction, the third divider extends away from the control nub in a third touchpad direction, and the fourth divider extends away from the control nub in a fourth touchpad direction that is opposite the third touchpad direction.

18. The touchpad of claim 17, where the plurality of functions includes a two-dimensional machine function; and the first, second, third and fourth dividers are configured to function as a dual-axis joystick and assigned to control the two-dimensional machine function;

such that the command processor is configured to generate and send commands to command the two-dimensional machine function in a first function direction based on touch by the operator of the first divider, is configured to generate and send commands to command the two-dimensional machine function in a second function direction based on touch by the operator of the second divider, is configured to generate and send commands to command the two-dimensional machine function in a third function direction based on touch by the operator of the third divider, and is configured to generate and send commands to command the two-dimensional machine function in a fourth function direction based on touch by the operator of the fourth divider; where the second function direction is opposite of the first function direction, and the fourth function direction is opposite of the third function direction.

19. The touchpad of claim 18, wherein each of the first, second, third and fourth dividers includes a proximal end closest to the control nub and a distal end furthest from the control nub;

wherein the two-dimensional function has a first limit in the first function direction, a second limit in the second function direction, a third limit in the third function direction, and a fourth limit in the fourth function direction; and the command processor is configured to generate and send commands to command the two-dimensional machine function to the first limit when the operator presses the distal end of the first divider, is configured to generate and send commands to command the two-dimensional machine function to the second limit when the operator presses the distal end of the second divider, is configured to generate and send commands to command the two-dimensional machine function to the third limit when the operator touches the distal end of the third divider, and is configured to generate and send commands to command the two-dimensional machine function to the fourth limit when the operator touches the distal end of the fourth divider.

\* \* \* \* \*